United States Patent
Berrange

(10) Patent No.: US 8,589,683 B2
(45) Date of Patent: Nov. 19, 2013

(54) AUTHENTICATION OF A SECURE VIRTUAL NETWORK COMPUTING (VNC) CONNECTION

(75) Inventor: Daniel P. Berrange, London (GB)

(73) Assignee: Red Hat, Inc., Raleigh, NC (US)

( * ) Notice: Subject to any disclaimer, the term of this patent is extended or adjusted under 35 U.S.C. 154(b) by 440 days.

(21) Appl. No.: 12/606,865

(22) Filed: Oct. 27, 2009

(65) Prior Publication Data

US 2011/0099374 A1    Apr. 28, 2011

(51) Int. Cl.
*G06F 21/00* (2013.01)

(52) U.S. Cl.
USPC .......................................................... 713/168

(58) Field of Classification Search
USPC ...................... 713/168, 161; 726/2
See application file for complete search history.

(56) References Cited

U.S. PATENT DOCUMENTS

| | | | |
|---|---|---|---|
| 2002/0010866 A1* | 1/2002 | McCullough et al. | 713/201 |
| 2002/0026464 A1* | 2/2002 | Jones et al. | 708/200 |
| 2003/0221100 A1* | 11/2003 | Russ et al. | 713/153 |
| 2006/0288219 A1* | 12/2006 | Adams et al. | 713/176 |
| 2007/0214455 A1* | 9/2007 | Williams et al. | 718/1 |
| 2008/0301303 A1* | 12/2008 | Matsuoka | 709/227 |
| 2009/0059878 A1* | 3/2009 | Tamura | 370/338 |

* cited by examiner

*Primary Examiner* — Brandon Hoffman
*Assistant Examiner* — Anthony Brown
(74) *Attorney, Agent, or Firm* — Lowenstein Sandler LLP

(57) ABSTRACT

A secure Virtual Network Computing (VNC) connection between a server and a client is authenticated using a series of message exchanges. A server receives a request from a client to establish a VNC connection. If the request indicates that the client supports an encryption scheme, the server provides a first set of mechanisms for a subsequent authentication process. If the request indicates that the client does not support the encryption scheme, the server provides the client a second set of mechanisms for the subsequent authentication process. The second set contains fewer mechanisms than the first set. The client chooses an authentication mechanism from the first set or the second set provided by the server. The server and the client then perform the subsequent authentication process, using the authentication mechanism chosen by the client, with a series of message exchanges.

17 Claims, 4 Drawing Sheets

AUTHENTICATION OF A SECURE VIRTUAL NETWORK COMPUTING (VNC) CONNECTION

TECHNICAL FIELD

Embodiments of the present invention relate to Virtual Network Computing (VNC), and more specifically, to the authentication of a secure VNC connection.

BACKGROUND

Virtual Network Computing (VNC) can be used in a graphical desktop sharing system that allows a client computer to remotely use the processing capabilities of a server computer. For example, the client can transmit keyboard and mouse events to the server, and the server can send screen updates back to the client. Thus, the client can be used as a control console, which sends commands to the server and watches the computing results of the server at a local display screen. The client and the server interact using a communication protocol (e.g., the Remote Frame Buffer (RFB) protocol) over a VNC connection.

VNC is not a secure protocol. Conventional VNC does not have built-in security mechanisms, such as data encryption. Therefore, data streams transmitted on a VNC connection over an untrusted network are subject to snooping by an intermediate agent performing packet capture.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
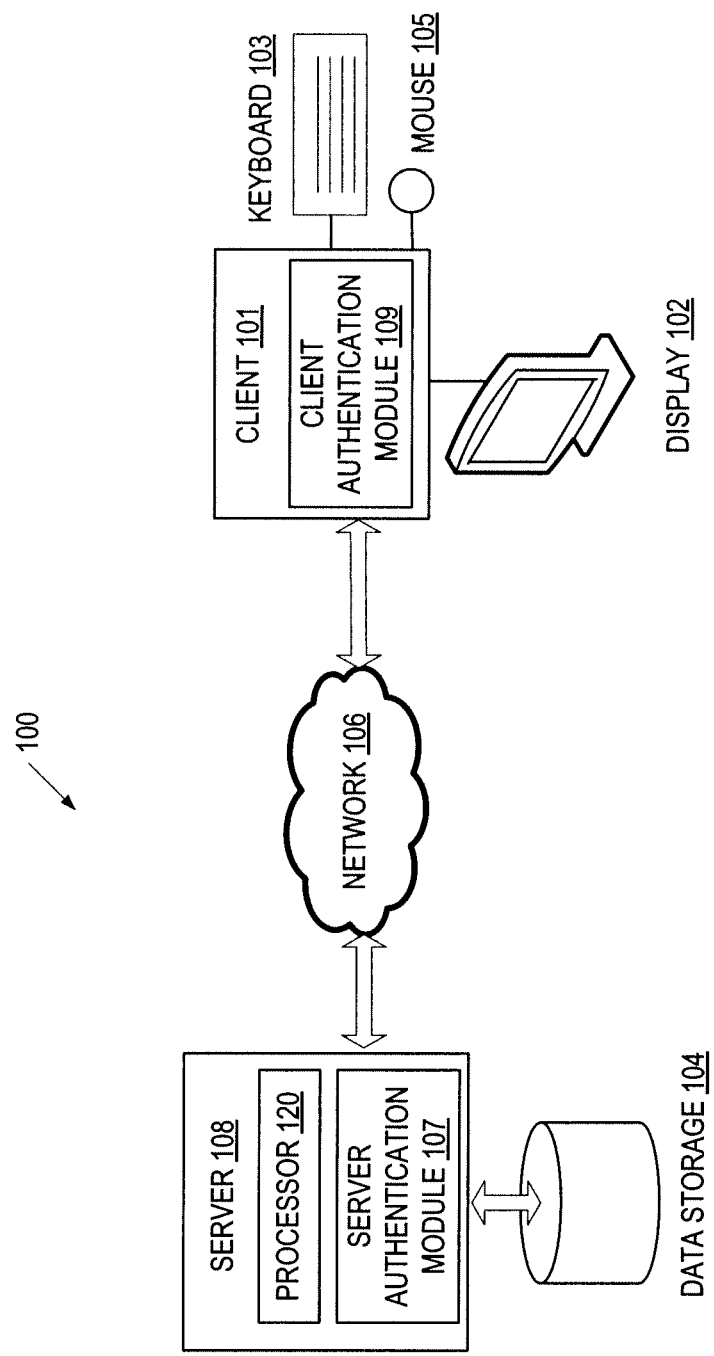
FIG. 1 is a block diagram of an exemplary network architecture in which embodiments of the invention may be implemented.

Described herein is a method and system for authenticating a Virtual Network Computer (VNC) connection. In one embodiment, a server and a client establish a secure VNC connection by negotiating encryption schemes and authentication mechanisms. The server and the client perform a handshake process that includes a series of message exchanges for authenticating a user of the client. The series of message exchanges may be performed in accordance with Simple Authentication and Security Layer (SASL). If the server and the client both support an encryption scheme for the VNC connection, such as VeNCrypt, the encryption scheme can be used in conjunction with SASL.

In one embodiment, when the server receives a request from a client to establish a VNC connection, the server determines whether the request indicates that the client supports an encryption scheme. If the request indicates that the client supports the encryption scheme, the server provides a first set of mechanisms for a subsequent authentication process. If the request indicates that the client does not support the encryption scheme, the server provides the client a second set of mechanisms for the subsequent authentication process. The second set contains fewer mechanisms than the first set. The client chooses an authentication mechanism from the first set or the second set provided by the server. The server and the client then perform the subsequent authentication process, using the authentication mechanism chosen by the client, with a series of message exchanges.

Conventional VNC connections do not have built-in encryption. Therefore, when using SASL on a VNC connection, the client may request strong encryption capabilities to ensure data security. The client may request a minimum security strength factor (SSF) for SASL. The minimum SSF is sufficiently high to prevent a brute force attack on the keys used for data encryption. The client may request that no "plain text" authentication can be used. This request can stop the server from using any authentication mechanism that is vulnerable to a packet capture on the network. The client may also request that no "anonymous" authentication can be used. This request can stop the server from using any authentication mechanism that allows anonymous users. Thus, users need to be formally identified. As a result, when using SASL on a VNC connection without an additional encryption scheme, the server only offers a small number of authentication mechanisms for the client to choose. By contrast, when using SASL on a VNC connection with an additional strong encryption scheme (e.g., VeNCrypt), the server can offer a large number of authentication mechanisms for the client to choose.

Embodiments of the present invention maximize the number of authentication mechanisms that an administrator or user can choose to use, while ensuring a high level of security.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates an exemplary network architecture 100 in which embodiments of the present invention may operate. The network architecture 100 may include a client computing system (also referred to as "client") 101 and a server computing system (also referred to as "server") 108 coupled to a network 106. The client 101 may be a workstation, personal computer (PC), mobile phone, palm-sized computing device, personal digital assistant (PDA), etc. In one embodiment, the client 101 can be a thin client that depends primarily on the server 108 for processing capabilities. The client 101 may be coupled to a number of I/O devices, such as a display 102, a keyboard 103 and a mouse 105. User input via the keyboard 103, the mouse 105, touch sensors (not shown) or other input devices can be sent to the server 108 via the network 106. The server 108 uses its processor 120 to process the user input and sends back an output to the client 101. For example, the output can be images for the user to view on the display 102, or audio signals for the user to hear from a speaker of the client 108. The processor 120 may include one or more processing devices, such as one or more central processing units (CPU), one or more graphics processing units (GPU), or other processing devices. The network 106 may be a public network (e.g., Internet) or a private network (e.g., Ethernet or a local area Network (LAN)). Any number of clients 101 may exist in the network architecture 100.

The server 108 may reside on one or more server machines. In one embodiment, the server 108 has graphical processing capabilities and can process graphics commands sent from the client 101. In one embodiment, the server 108 may host one or more virtual machines. Each virtual machine provides a virtual desktop for the client 101 and executes some or all of the graphics operations relating to the virtual desktop. In alternative embodiments, the server 108 may provide processing capabilities to the client 101 in a non-virtualized environment. The server 108 is coupled to data storage 104, which may comprise mass storage devices, such as magnetic or optical storage based disks, tapes or hard drives.

According to one embodiment of the present invention, the client 101 may request a Virtual Network Computer (VNC) connection to the server 108 for accessing the processing power of the server 108. The VNC connection allows the client 101 to transmit keyboard and mouse events to the server 108, and the server 108 to transmit processing results back to the client 101. The server 108 may authenticate the VNC connection; that is, to authenticate that data transferred over the VNC connection is from an authorized source. During the authentication process, the user enters his credentials (e.g., user ID, password and/or other identifying information) to prove his identity to the server 108. In one embodiment, the authentication process includes a series of handshakes between the sever 108 and the client 101. The sever 108 and the client 101 use the handshakes to negotiate encryption schemes and authentication mechanisms, which will be used for authenticating the user and encoding the message exchanges between the sever 108 and the client 101. In one embodiment, the server 108 includes a server authentication module 107 and the client 101 includes a client authentication module 109 to perform the authentication process. The server authentication module 107 and the client authentication module 109 may include plug-in components. As will be described in greater detail with reference to FIG. 2, the server authentication module 107 and the client authentication module 109 performs handshakes to negotiate encryption schemes and authentication mechanisms.

Figure 2:
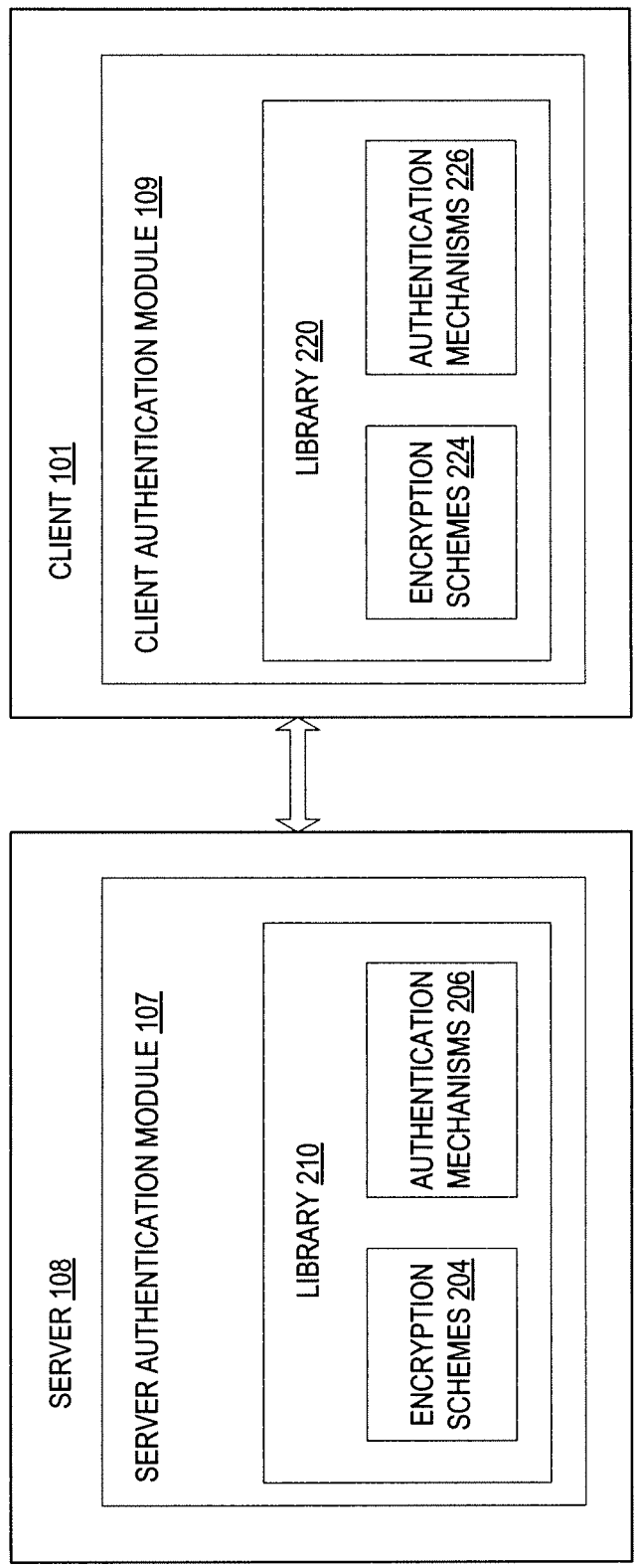
FIG. 2 is a block diagram of one embodiment of authentication modules in a server and a client.

FIG. 2 is a block diagram of one embodiment of the server authentication module 107 and the client authentication module 109. The server authentication module 107 includes a library 210 that stores a number of authentication mechanisms 206 and a number of encryption schemes 204. The client authentication module 109 also includes a library 220 that stores a number of authentication mechanisms 226 and a number of encryption schemes 224. The libraries 210 and 220 can be configured by a system administrator to selectively enable some of the encryption schemes 204 and 224, and some of the authentication mechanisms 206 and 226. Using a series of message exchanges, the server 108 and the client 101 negotiate their preferred encryption scheme and authentication mechanism. Once an agreement is reached between the server 108 and the client 101, the user of the client 101 will be authenticated using the negotiated authentication mechanism and data will be exchanged using the negotiated encryption scheme.

In one embodiment, the negotiated encryption scheme may be VeNCrypt, which is an extension to the VNC authentication protocol. VeNCrypt encrypts data streams transmitted on a VNC connection using Transport Layer Security (TLS) or Secure Socket Layer (SSL) (referred to as "TLS/SSL"), and identifies the server 108 and the client 101 using X.509 certificates. VeNCrypt can be used on top of (i.e., in addition to) the negotiated authentication mechanism.

In one embodiment, the negotiated authentication mechanism may be one of the authentication mechanisms defined by Simple Authentication and Security Layer (SASL), which is a framework for adding authentication support to connection-based protocols. SASL includes a number of authentication mechanisms, which also provide a data encryption security layer with various security strength factors (SSFs). The client 101 and the server 108 may negotiate the use of the mechanisms' security layer and its SSF.

In one embodiment, the server 108 and the client may first perform authentication according to VeNCrypt, and then perform authentication according to SASL. When VeNCrypt is used on top of SASL, the server 108 and the client 101 may choose to forgo the use of the security layer in SASL. Encrypting data with both of TLS/SSL (according to VeNCrypt) and the security layer (according to SASL) may waste CPU resources for no greater security benefit. Thus, in one embodiment, the server 108 and the client 101 may choose to use either the TLS/SSL encryption or the SASL encryption, but not both.

In one embodiment, the security layer options may vary based on whether VeNCrypt is in use. If VeNCrypt is used, a large number of SASL mechanisms can be used for authentication. If VeNCrypt is not used, only a small number (e.g., 2) of SASL mechanisms can be used for both authentication and encryption. Alternatively, the security layer options may vary based on whether an encryption scheme analogous to VeNCrypt (e.g., an external SSL tunnel) is used. A further option allows for the security layer options to vary based on whether the communication channel is susceptible to packet capture (e.g., a local connection over UNIX domains sockets is not susceptible to packet capture, a Transmission Control Protocol (TCP) connection running over the public Internet without any VPN software protecting the channel is susceptible to packet capture).

The server 108 and the client 101 can set up preferences for the SSF of the security layer. These preferences can be used by the server 108 and the client 101 to help determine which authentication mechanisms are acceptable for use on a VNC connection. The actual strength of the security layer can be negotiated during a series of message exchanges between the server 108 and the client 101.

In the following descriptions, VeNCrypt and SASL are used as an example of the encryption scheme and authentication process for VNC, respectively. It is understood that other encryption schemes and authentication processes may be used instead of VeNCrypt and SASL.

Figure 3:
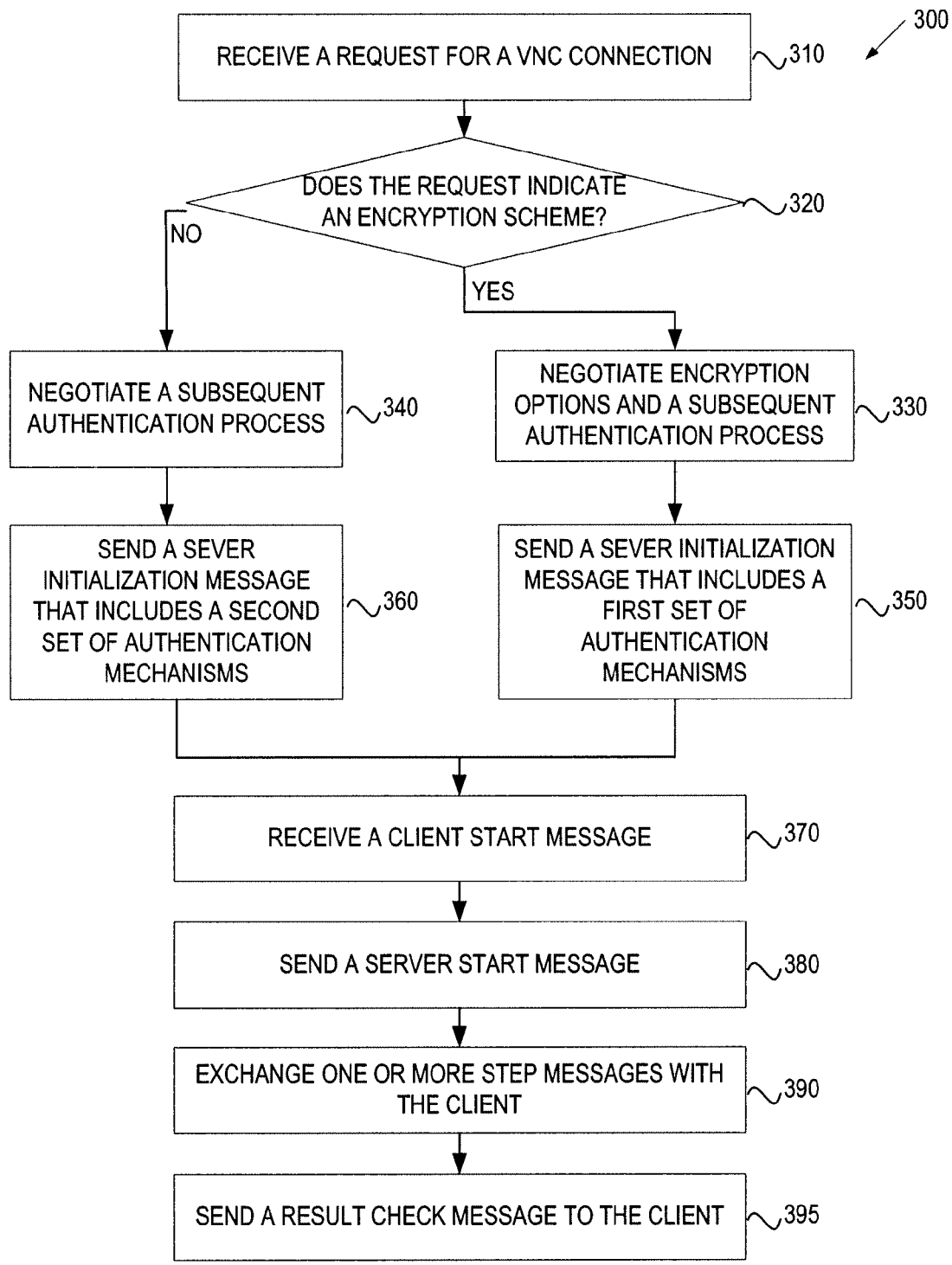
FIG. 3 is a flow diagram of one embodiment of a method for authenticating a VNC connection using a series of message exchanges.

FIG. 3 is a flow diagram illustrating one embodiment of a method 300 for establishing a VNC connection between the client 101 and the server 108. The method 300 may be performed by computer system 400 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the server 101 (e.g., the server authentication module 107) and the client 101 (e.g., the client server authentication module 109) of FIGS. 1 and 2.

Referring to FIG. 3, in one embodiment, the method 300 begins when the server 108 receives a request from the client 101 for establishing a VNC connection (block 310). Upon receiving the request, the server 108 determines whether the request indicates that the client 101 supports an encryption scheme, such as VeNCrypt (block 320). In one embodiment, the request may include an argument that indicates VeNCrypt is supported.

If the request indicates that VeNCrypt is supported, the server 108 confirms that VeNCrypt is to be used. The server 108 and the client 101 then negotiate encryption options, such as whether to use X.509 certificates, and which subsequent authentication process to use, e.g., SASL (block 330). If the request does not specify an encryption scheme, the server 108 and the client 101 negotiate which subsequent authentication process to use (block 340). For example, the client 101 may indicate that it supports SASL, and the server 108 confirms the use of SASL. Other authentication processes, which involve a series of negotiations between the client 101 and the server 108, may be analogous to SASL and may be used instead of SASL. If either the client 101 or the server 108 does not support SASL or other analogous authentication processes, the server 108 may deny the request for a VNC connection.

In a scenario where SASL is used with VeNCrypt, after confirming the use of SASL, the client 101 performs a standard TLS/SSL handshake. If the handshake is successful, then the following communication between the server 108 and the client 101 is encrypted by the TLS/SSL session. After the initial handshake, the client 101 and the server 108 begin a series of message exchanges to negotiate authentication mechanisms.

In a scenario where SASL is used without VeNCrypt, the client 101 will request strong encryption capabilities in the security layer of SASL. The server 108 will also set up similar preferences for strong encryption capabilities. In an alternative scenario where VeNCrypt is used with SASL, the client 101 may choose an authentication mechanism without encryption capabilities or with weak encryption capabilities. The server 108 then uses the negotiated authentication mechanism to authenticate the user of the client 101 and the source of data transmitted on the VNC connection.

In one embodiment, the series of message exchanges begins with the server 108 sending a server initialization message to the client 101. The server initialization message includes advertised authentication mechanisms that the server 108 supports for a VNC connection. The advertised authentication mechanisms may be a subset of all of the mechanisms that the server 108 supports and may be determined by a system administrator. If the VeNCrypt or other strong encryption scheme is used, the server initialization message includes a first set of authentication mechanisms (block 350). If the VeNCrypt or other strong encryption scheme is not used, the server initialization message includes a second set of authentication mechanisms (block 360). The first set contains more authentication mechanisms than the second set. The first set and the second set contain authentication mechanisms that the server 108 is prepared to accept from the client 101. For example, the first set may contain "ANONYMOUS, KERBEROS_V4, DIGEST-MD5" and the second set may contain only two options: "DIGEST-MD5, GSSAPI." That is, the server 108 provides more options to the client 101 when VeNCrypt is used than when VeNCrypt is not used.

In the above example, the first set contains an anonymous option and the second set does not contain the anonymous option. This means that a user of the client 101 can login as an anonymous guest when VeNCrypt is used, but cannot do so when VeNCrypt is not used.

After the client 101 receives the server initialization message, the client 101 replies with a client start message (block 370). The client start message may indicate one of the authentication mechanisms advertised by the server 108 and chosen by the client 101. The choice of the client 101 may be predetermined by a system administrator. Alternatively, the client start message may indicate all of the authentication mechanisms advertised by the server 108 and let the server 108 determine which mechanism to be used.

Subsequently, the server 108 sends a server start message to the client 108 to confirm which authentication mechanism is to be used (block 380). The server 108 then exchanges a series of step messages with the client 101, using the confirmed authentication mechanism, until the authentication process is completed (block 390).

At this point, the client 101 and server 108 have completed the SASL negotiation process. If the client 101 had requested a security layer (e.g., when VeNCrypt is not used), the client 101 will validate that a suitable security layer was negotiated with the server 108. If the security layer is unsuitable (e.g., the SSF of the security layer does not meet the minimum requirement of the client 101), the client 101 will drop the connection to the server 108. If the security layer is enabled and suitable for the client (e.g., the SSF of the security layer meets the minimum requirement of the client 101), all future messages transmitted over the VNC connection will be passed through an "sasl_encode" application programming interface (API), and all messages received from the server 108 after a result check message from the server 108 will be passed through an "sasl_decode" API. In the embodiment shown in FIG. 2, the "sasl_encode" and "sasl_decode" APIs may be part of the client authentication module 109. The client 101 then proceeds to wait for a result check message from the server 108 to determine whether the server 108 considers the negotiation successful.

At the server side, if the SASL negotiation indicated that the client 101 failed to correctly authenticate, the server will send a result check message, indicating that the authentication has failed and then drop the connection. If the SASL negotiation indicated that the client 101 has been correctly authenticated and that the server 101 had requested a security layer (e.g., when VeNCrypt is not used), the server 108 will validate that a suitable security layer was negotiated with the client 101. If the security layer is unsuitable, the server 108 will send a result check message, indicating that authentication has failed and then drop the connection to the client 101. If the security layer is enabled and suitable for the server 108, all messages transmitted over the VNC connection after the result check message will be passed through the "sasl_encode" API, and all messages received from the client 101 will be passed through the "sasl_decode" API. That is, the messages transmitted on the VNC will be encrypted according to the negotiated security layer having the negotiated SSF. In the embodiment shown in FIG. 2, the "sasl_encode" and "sasl_decode" APIs may be part of the server authentication module 107. The server 108 then proceeds to send the result check message to the client 101 to indicate that the authentication was successful (block 395).

During the authentication process described above, a user of the client 101 may be prompted for entering his credentials. The exact credentials may depend on what SASL mechanism is in use. Some SASL mechanisms may use user ID and password, others (e.g., Kerberos) may require a "ticket" to be obtained beforehand from an authentication server. The time at which the user credentials are requested may vary depending on which SASL mechanism is in use. Some SASL mechanisms may request the credentials before the client 101 sends the start message to the server 108 at block 370. Other SASL mechanisms may request the credentials later during the exchange of step messages at block 390. In a scenario where the SASL mechanism (e.g., Kerberos) requires that a ticket be acquired ahead of time, the mechanism may not even be advertised to the server if the client does not have the ticket at the time of connection.

Figure 4:
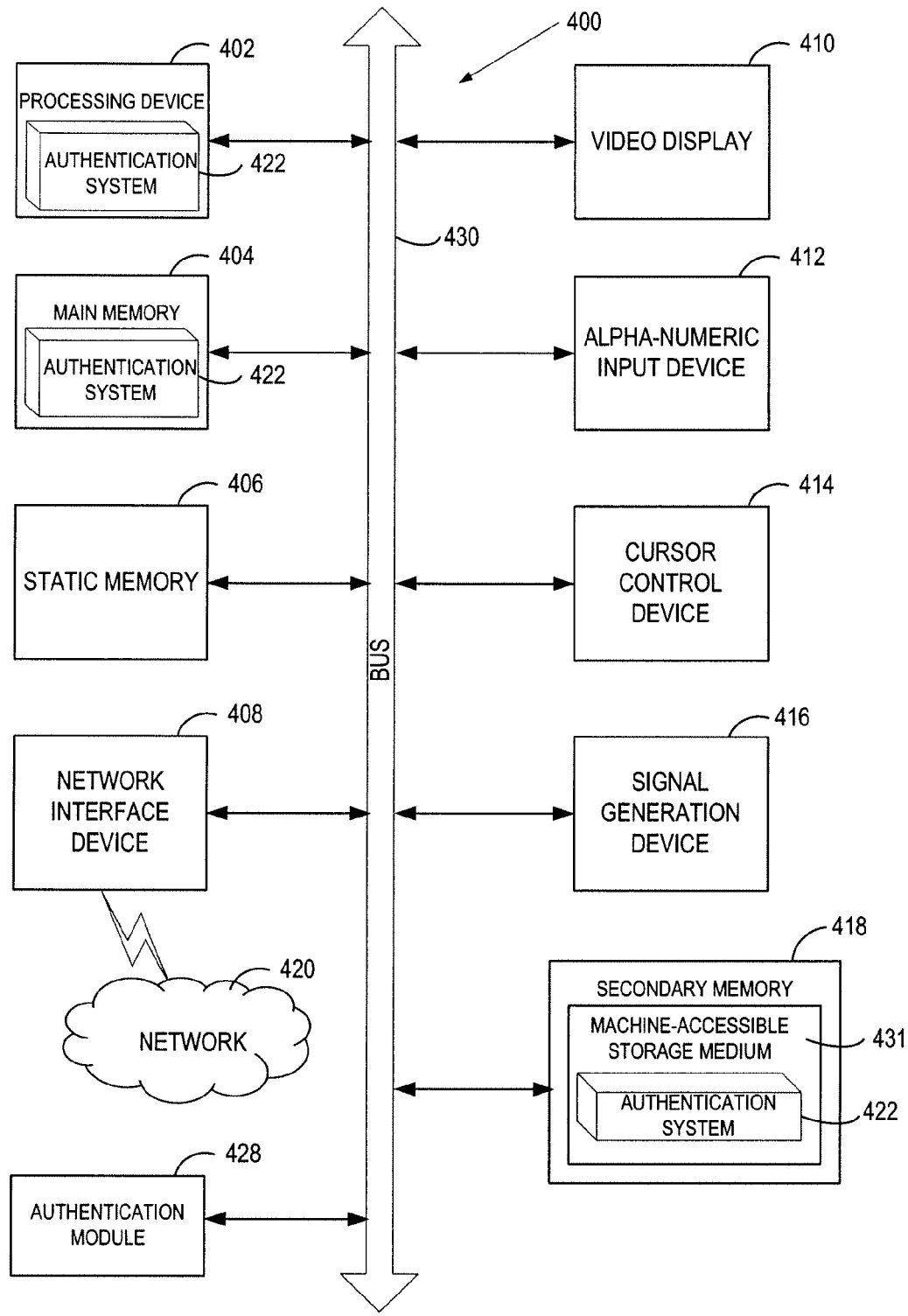
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic for performing the authentication operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., an authentication system 422) embodying any one or more of the methodologies or functions described herein (e.g., the authentication modules 107, 109 of FIGS. 1 and 2). The authentication system 422 may also reside, completely or at least partially, within the main memory 404 and/or within the processing device 402 during execution thereof by the computer system 400; the main memory 404 and the processing device 402 also constituting machine-readable storage media. The authentication system 422 may further be transmitted or received over a network 420 via the network interface device 408.

The machine-readable storage medium 431 may also be used to store the authentication system 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 400 may additionally include authentication modules 428 for implementing the functionalities of the authentication modules 107, 109 of FIGS. 1 and 2. The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "providing", "performing", "requesting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a request from a client computing system for establishing a Virtual Network Computing (VNC) connection;
    determining, by the processing device, whether the request indicates an encryption scheme;
    in response to a determination that the request indicates the encryption scheme, the processing device providing the client computing system a first set of authentication mechanisms for a subsequent authentication process;
    in response to a determination that the request does not specify the encryption scheme, the processing device providing the client computing system a second set of authentication mechanisms for the subsequent authentication process, wherein the second set contains fewer authentication mechanisms than the first set;
    performing, by the processing device, the subsequent authentication process via a authentication mechanism selected from the set provided to the client computing system;
    sending a result check message to the client computing system to indicate that the VNC connection has been successfully authenticated; and
    exchanging encoded messages with the client computing system using a negotiated security layer with a negotiated security strength.

2. The method of claim 1, wherein the processing device responds to user input to the client computing system and generates output to the client computing system.

3. The method of claim 1, wherein the encryption scheme comprises a VeNCrypt extension to a VNC authentication protocol.

4. The method of claim 1, wherein the subsequent authentication process is performed according to Simple Authentication and Security Layer (SASL).

5. The method of claim 1, wherein the selected authentication mechanism is performed using a security layer that meets a minimum security requirement of the client computing system.

6. The method of claim 1, wherein the first set contains an anonymous option, and the second set does not contain the anonymous option.

7. The method of claim 1, further comprising:
    sending advertised authentication mechanisms to the client computing system;
    receiving a chosen authentication mechanism from the client computing system; and
    confirming that the chosen authentication mechanism is to be used.

8. A non-transitory computer readable storage medium including instructions that, when executed by a processing device, cause the processing device to perform operations comprising:
    receiving, by the processing device, a request from a client computing system for establishing a Virtual Network Computing (VNC) connection;
    determining, by the processing device, whether the request indicates an encryption scheme;
    in response to a determination that the request indicates the encryption scheme, providing the client computing system, by the processing device, a first set of authentication mechanisms for a subsequent authentication process;
    in response to a determination that the request does not specify the encryption scheme, providing the client computing system, by the processing device, a second set of authentication mechanisms for the subsequent authentication process, wherein the second set contains fewer authentication mechanisms than the first set;
    performing, by the processing device, the subsequent authentication process via a authentication mechanism selected from the set provided to the client computing system;
    sending a result check message to the client computing system to indicate that the VNC connection has been successfully authenticated; and
    exchanging encoded messages with the client computing system using a negotiated security layer with a negotiated security strength.

9. The non-transitory computer readable storage method of claim 8, wherein the encryption scheme comprises a VeNCrypt extension to a VNC authentication protocol.

10. The non-transitory computer readable storage method of claim 8, wherein the subsequent authentication process is performed according to Simple Authentication and Security Layer (SASL).

11. The non-transitory computer readable storage method of claim 8, wherein the selected authentication mechanism is performed using a security layer that meets a minimum security requirement of the client computing system.

12. The non-transitory computer readable storage method of claim 8, wherein the first set contains an anonymous option and the second set does not contain the anonymous option.

13. The non-transitory computer readable storage method of claim 8, wherein the operations further comprise:
    sending advertised authentication mechanisms to the client computing system;
    receiving a chosen authentication mechanism from the client computing system; and
    confirming that the chosen authentication mechanism is to be used.

14. A system comprising:
    a network interface device; and
    a processing device to:

receive, via the network interface device, a request from a client to establish a Virtual Network Computing (VNC) connection, determine whether the request indicates an encryption scheme, provide the client, via the network interface device, a first set of authentication mechanisms for a subsequent authentication process when the request indicates the encryption scheme, provide the client, via the network interface device, a second set of authentication mechanisms for the subsequent authentication process when the request does not indicate the encryption scheme, wherein the second set contains fewer authentication mechanisms than the first set, perform the subsequent authentication process via an authentication mechanism selected from the set provided to the client, send, via the network interface device, a result check message to the client to indicate that the VNC connection has been successfully authenticated, and exchange encoded messages with the client using a negotiated security layer with a negotiated security strength.

15. The system of claim 14, wherein the encryption scheme comprises a VeNCrypt extension to a VNC authentication protocol.

16. The system of claim 14, wherein the subsequent authentication process is performed according to Simple Authentication and Security Layer (SASL).

17. The system of claim 14, wherein the authentication mechanisms in the second set are to be used with a security layer, which has a security strength that meets a minimum requirement of the client.

* * * * *